United States Patent [19]
Imris

[11] 3,760,205
[45] Sept. 18, 1973

[54] VARIABLE-RELUCTANCE ELECTRICAL GENERATOR

[76] Inventor: Pavel Imris, Konigsbergerstr. 4, Eldagsen, Germany

[22] Filed: Sept. 11, 1972

[21] Appl. No.: 287,821

[30] Foreign Application Priority Data
Nov. 12, 1971 Germany.............. P 21 56 274.3

[52] U.S. Cl. .............................. 310/168, 310/266
[51] Int. Cl. .......................................... H02k 19/20
[58] Field of Search................... 310/111, 168, 266, 310/155, 261, 67, 169, 170, 163

[56] References Cited
UNITED STATES PATENTS

| | | | |
|---|---|---|---|
| 2,221,812 | 11/1940 | Nilson.................................. | 310/163 |
| 2,418,471 | 4/1947 | Holden et al. ....................... | 310/111 |
| 2,796,542 | 6/1957 | Bekey et al. ....................... | 310/168 X |
| 3,132,269 | 5/1964 | Craske................................. | 310/111 |
| 3,321,652 | 5/1967 | Opel ................................... | 310/168 |
| 831,442 | 9/1906 | Kelsey................................. | 310/168 |
| 3,071,703 | 1/1963 | Mathews.............................. | 310/111 |

FOREIGN PATENTS OR APPLICATIONS

| | | | |
|---|---|---|---|
| 996,645 | 12/1951 | France................................. | 310/178 |

Primary Examiner—D. F. Duggan
Attorney—Kurt Kelman

[57] ABSTRACT

An electrical generator particularly designed to generate high voltages is disclosed. The generator includes an induction coil and a driven rotor associated with the coil and a curvilinear, spirally or helically-shaped band made of ferromagnetic material provided on the surface of the rotor. A magnet is provided which produces a magnetic field. The terminal sections of the ferromagnetic band which envelop a section of the induction coil are positioned opposite to the North and South poles of the magnet and the ferromagnetic band is so proportioned and affixed that the maximum effective band length for transmitting continuous magnetic flux to the induction coil, measured in degrees of angle, is 720°, and the minimum effective band length is 360°. The width of the poles and the gap between the poles are of such a dimension that when the ferromagnetic band turns through half a revolution the effective band length for the magnetic flux is changed by 360°.

7 Claims, 2 Drawing Figures

VARIABLE-RELUCTANCE ELECTRICAL GENERATOR

The invention relates to an electrical generator, and to a high-voltage generator particularly.

In modern industry, there is a heavy demand for high voltage power supplies, for example in the chemical industry for chemical synthesis in electrical discharges. At the present time high voltage power supplies are, in practice, high voltage transformers connected with electrical generators, in which the resulting combination has a very high inductance. When, for example, a high voltage power supply of this kind is connected with an ozone generator, then the sparks persist for a long time in the ozone generator and, because of this, the efficiency for producing ozone is low.

In conventional rotary generators, vibrations occur in the rotor because of variations in the electrical current. These vibrations are hard to control so that, in practice, it is a very difficult and expensive matter to ensure a constant speed of rotation in the rotor and thereby a constant frequency in the current generated.

The object of the invention is the provision of an electrical generator, particularly for the generation of high voltages, which avoids the shortcomings set forth above.

This problem is solved in the generator according to the invention by the fact that a ferromagnetic band envelops a section of the induction coil, and its terminal sections are located opposite the two poles of a magnet in such a manner that the effective band length transmitting magnetic flux to the induction coil, varies cyclically during operation of the generator.

The curvilinear, spirally or helically-shaped band rotates between the elctro-magnet and a section of the induction coil, the coil itself running inside the band parallel to the axis of the band and also around the outer surface of the band.

The magnet is located on the outer side of the band and the magnetic field extends from one pole piece by way of an air gap through the ferromagnetic band and, by way of another air gap, back to the other pole piece of the magnet. When the ferromagnetic band rotates around its axis the magnetic flux flows longitudinally through the band alternatingly through 360° and through 2 × 360°.

In this manner a high voltage is generated having a frequency directly proportional to the speed of rotation of the band.

This frequency, because of the negligible effect of Lenz's force, can be kept within very precise bounds. For example, at 50 cycles, the accuracy of the frequency can be maintained between $\pm 10^{-4}$ seconds$^{-1}$, which is very important for utilization of this generator in the field of plasma physics.

This generator, which needs no commutator, has a low inductance and for that reason can be used with special advantage in the following fields:

a. for the production of a so-called hybrid plasma under conditions of arc discharge with very short sparks,
b. for the production of ozone by arc discharge,
c. for chemical synthesis,
d. for air purification in electro-static filters,
e. for the operation of so-called plasma generators in which, it is possible to achieve practically a cos $\phi$ of one.

A generator according to the invention will now be described in more detail with reference to the accompanying drawings in which.

During rotation of the ferromagnetic band 1 around its axis the magnetic flux from the pole piece S to the pole piece N through the band, is never interrupted. There is cyclic change in the effective band length carrying the magnetic flux. If the length of the band 1 is measured in degrees of angle then the path of the magnetic flux varies during each revolution between 1 × 360°, and 2 × 360°.

When the band 1 rotates, the number of magnetized turns of the band which act upon the induction coil 3 change cyclically between one and two. The effective length of the band can be any multiple of 360°. To produce an ideal sine curve for the induced current the band 1 should have $n + \frac{2}{3}$ turns, wherein $n$ is an integer and at least 2, and the poles of the magnet should be located at the beginning and at the end of the band 1.

This means that whenever the band makes one revolution one sinusoidal cycle of electrical voltage is induced in the induction coil 3. The induction coil 3 and the electro-magnet 2 are stationary and only the ferromagnetic, curvilinear, band 1 turns.

The frequency of the induced electrical voltage which depends on the rotary speed of the ferromagnetic band and the voltage in the induction coil depends on the number of its windings as well as on the magnetic flux and on the rotary speed of the band 1.

Figure 1:
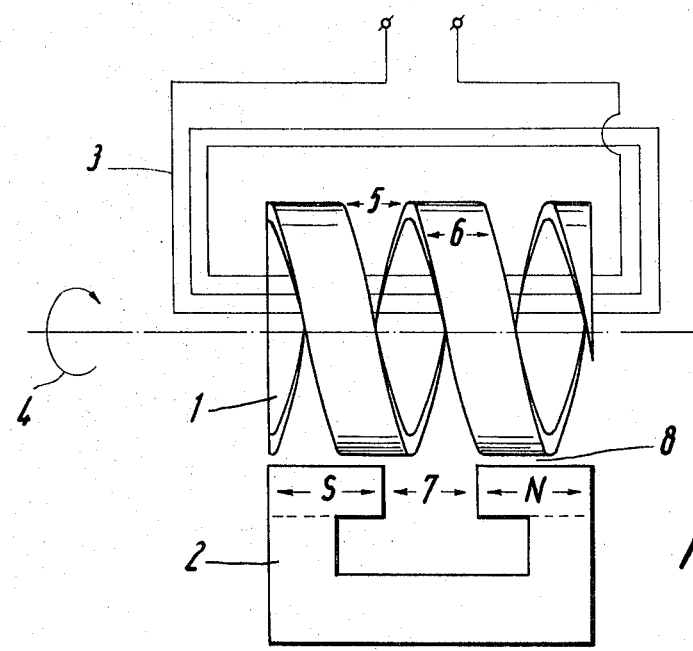
FIG. 1 shows basic elements of the generator in side view.
Figure 2:
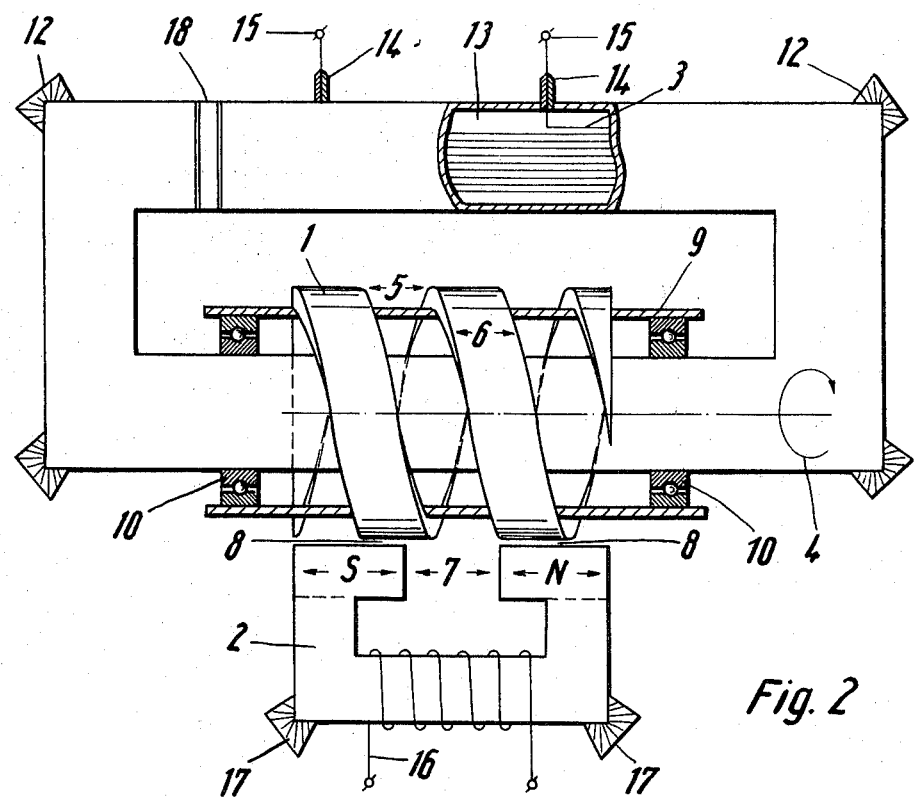
FIG. 2 illustrates the generator in side elevation and partly in section.

For high voltages the induction coil 3 is enclosed in a tubular container 11 filled with transformer oil 13 or other insulating liquid, as is shown in FIG. 2.

The tube 11 is provided with bearings 10 which carry a coaxial support tube 9 for the ferromagnetic band 1. The tube 9 is rotated by a motor (not illustrated) about the axis 4. The electro-magnet 2 is energized by a coil 16 and carried by pedestals 17 on a platform on which the container 11 is also fastened by means of supports 12. The container 11 is made of metal, and, an insulation section 18 is provided in order to prevent an electrical current from also being induced in the container.

The pole pieces N, S of the electro-magnet 2, are made of a soft ferromagnetic material, and form a magnetic circuit with band 1. When the band 1 rotates, an electro-motive force is induced in the induction coil 3 and varies with the applied magnetic flux in a sine cycle. If an electrical resistance is inserted between the terminals 15 of the coil which project from the container 11 through insulating bushings 14, a sinusoidally alternating electric current flows across the resistance and through coil 3.

A very important advantage of this generator resides in the very low inductance of the induction coil 3.

It is so low because the ferromagnetic band is always under the influence of the magnetic flux. The intensity of the magnetic field in band 1 is constant, whereby the relative magnetic inductivity of the band 1 is constant and small. The absolute magnetic inductivity of the band 1 should be as high as possible.

This low inductance is of advantage in the production of ozone as well as for special applications in plasma chemistry and plasma physics. The frequency of the voltage produced by the generator, is stable ecause the mechanical rotation of band 1 can be exactly regulated. The magnetic flux which envelops the induction coil, in accordance with Lenz's Law, has an effect on the rotation of the ferromagnetic band, which keeps the rotor free of mechanical oscillations during rotation.

In the illustrated generator the length of the band must equal at least twice 360°. For perfect sine curve shape of the electrical voltage produced by this generator the following parameters may be utilized, by way of example only.

Length of the ferromagnetic band: 2-⅔ × 360°.

The axial width 6 of the band should be equal to the axial width of the gap 5 between the turns of the band 1.

The gap 7 between the pole pieces S and N should be equal to the width 6 multiplied by 4/3, while the width of each magnetic pole pieces should be equal to the width 6 multipled by 5/3.

If, by way of example, the length of the band equals 3.666 × 360°, then the gap 7 must be equal to:

(width 6 times 4/3) + twice the width 6 of the band.

If the length of the band equals 4-⅔ × 360°, then the gap 7 must be equal to (width 6 of the band × 4/3) + 4 times the width 6 of the band.

If the length of the band equals 5-2/3 × 360°, then the gap 7 must be equal to (width 6 of the band × 4/3) + 6 times the width of the band, and so on so that the gap 7 is equal to the width of the band times $(2n - 8/3)$, $n$ being as defined above.

The ferromagnetic band 1 must be made of soft magnetic material, i.e., the coercive force must be minimal, the hysteresis curve must be narrow and the magnetic permeability must be as high as possible. In addition, the electrical resistance of the ferromagnetic band must be as great as possible. An ideal material for this band is ferrite, however, cast steel, permalloy or superalloy, among others, might also be used.

The electro-magnet 2 can be constructed in any well-known manner.

The support tube 9 is made of material which is nonmagnetic and which also does not conduct electricity. The walls of this tube need not be smooth but may be grooved.

I claim:

1. An electric generator comprising:
   a. an induction coil having a plurality of windings and extending in a closed loop about an opening;
   b. an elongated body of ferromagnetic material extending about a section of said loop in a plurality of spaced turns transverse to said windings and passing through said opening;
   c. magnet means for inducing longitudinal magnetic flux in a longitudinal portion of said body constituting said turns; and
   d. operating means for cyclically varying the length of said portion.

2. A generator as set forth in claim 1, wherein said turns define a surface of circular cross section about an axis, said magnet means include two pole pieces, means for imparting opposite magnetic polarity to said pole pieces, mounting means mounting said pole pieces at respective fixed radial distances relative to said axis from said surface, respective longitudinal portions of said body being nearest said two pole pieces, and said operating means include means for varying the axial spacing of said nearest portions from each other.

3. A generator as set forth in claim 2, wherein said mounting means include means for holding said pole pieces in respective fixed axial positions, and said means for varying said axial spacing include means for rotating said body about said axis.

4. A generator as set forth in claim 3, wherein said turns extend in a continuous helix about said axis, said pole pieces are spaced from said axis in a common radial direction, and said operating means hold said body in a fixed axial position during said rotating.

5. A generator as set forth in claim 1, further comprising a container enveloping said coil, and a body of liquid insulating material in said casing, said turns enveloping said container.

6. A generator as set forth in claim 5, wherein said operating means include means for rotating said body about said section of said loop.

7. A geerator as set forth in claim 4, wherein said spaced turns extend in a helix about an axis, said body is a band having a longtudinally continuous face in a cylindrical surface about said axis, the number of said turns is at least two, said magnet means including two pole pieces, means for imparting opposite magnetic polarity to said pole pieces, mounting means mounting said pole pieces in axially spaced axial alignment at respective fixed radial distances from said cylindrical surface, said operating means including means for rotating said body about said axis relative to said pole pieces and to said coil.

* * * * *